United States Patent
Schaeffer

(10) Patent No.: US 9,856,897 B2
(45) Date of Patent: Jan. 2, 2018

(54) EXPANSION ANCHOR

(71) Applicant: Hilti Aktiengesellschaft, Schaan (LI)

(72) Inventor: Marc Schaeffer, Altendorf (CH)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/022,164

(22) PCT Filed: Sep. 2, 2014

(86) PCT No.: PCT/EP2014/068579
§ 371 (c)(1),
(2) Date: Mar. 15, 2016

(87) PCT Pub. No.: WO2015/036281
PCT Pub. Date: Mar. 19, 2015

(65) Prior Publication Data
US 2016/0238051 A1    Aug. 18, 2016

(30) Foreign Application Priority Data
Sep. 16, 2013   (EP) ..................... 13184593

(51) Int. Cl.
*F16B 13/06*    (2006.01)

(52) U.S. Cl.
CPC ................... *F16B 13/065* (2013.01)

(58) Field of Classification Search
CPC ...... F16B 13/06; F16B 13/065; F16B 13/066; E21D 21/0026; E21D 21/008
USPC ............. 411/21, 49, 50, 59, 73, 76, 80.5, 53
See application file for complete search history.

(56) References Cited

U.S. PATENT DOCUMENTS

| 674,074 A | * | 5/1901 | Bennett | F16B 13/066 16/39 |
| 674,715 A | | 5/1901 | Summerer | |
| 1,276,708 A | * | 8/1918 | Bair | F16B 13/066 411/53 |
| 1,291,119 A | * | 1/1919 | Pleister | F16B 13/066 411/65 |

(Continued)

FOREIGN PATENT DOCUMENTS

| CA | 953958 A | 9/1974 |
| DE | 1 109 631 B | 6/1961 |

(Continued)

OTHER PUBLICATIONS

Singapore Search Report issued in Singaporean counterpart application No. 11201601606X dated Oct. 6, 2016 (Three (3) pages).

(Continued)

*Primary Examiner* — Roberta Delisle
(74) *Attorney, Agent, or Firm* — Crowell & Moring LLP

(57) ABSTRACT

An expansion anchor with a bolt as a first element and with an expansion sleeve, which at least partially surrounds the bolt, as a second element, is disclosed. The bolt has an expansion region for widening the expansion sleeve. One of the two elements has a groove running in the longitudinal direction of the expansion anchor and the other element has a projection, which engages at least sectionally in the groove. The groove has a narrowing, which inhibits an axial movement of the expansion sleeve relative to the bolt.

9 Claims, 1 Drawing Sheet

(56) References Cited

U.S. PATENT DOCUMENTS

| | | | | |
|---|---|---|---|---|
| 1,381,428 | A | * | 6/1921 | Peelle .................... F16B 13/065 411/55 |
| 1,396,569 | A | * | 11/1921 | Girvan .................. F16B 13/122 411/61 |
| 3,236,144 | A | * | 2/1966 | Taylor .................... F16B 13/063 411/53 |
| 3,379,089 | A | * | 4/1968 | Williams ................. E21D 21/00 411/46 |
| 3,750,526 | A | | 8/1973 | Lerich |
| 4,650,384 | A | * | 3/1987 | McIntyre .............. F16B 13/045 411/44 |
| 4,770,581 | A | * | 9/1988 | Limbrick .............. F16B 13/045 411/50 |
| 5,284,409 | A | | 2/1994 | Miyanaga |
| 6,524,046 | B2 | * | 2/2003 | Hsu ........................ F16B 13/065 411/51 |
| 7,896,594 | B2 | * | 3/2011 | Nardi .................... F16B 13/003 411/29 |
| 2001/0010787 | A1 | | 8/2001 | Hsu |
| 2003/0123948 | A1 | | 7/2003 | Fuchs et al. |
| 2007/0224015 | A1 | * | 9/2007 | Ayrle .................... F16B 13/065 411/55 |
| 2009/0274533 | A1 | * | 11/2009 | Zimmer ................ F16B 13/002 411/49 |
| 2010/0143067 | A1 | * | 6/2010 | Gaudron .................. C21D 1/25 411/354 |

FOREIGN PATENT DOCUMENTS

| | | |
|---|---|---|
| DE | 2 256 822 A1 | 6/1974 |
| DE | 35 09 986 A1 | 10/1986 |
| DE | 101 08 844 A1 | 9/2002 |
| EP | 0 515 916 A2 | 12/1992 |
| GB | 932693 A | 7/1963 |
| RU | 2 223 420 C2 | 10/2003 |
| WO | WO 83/03646 A1 | 10/1983 |

OTHER PUBLICATIONS

Singapore Written Opinion issued in Singaporean counterpart application No. 11201601606X dated Oct. 6, 2016 (Five (5) pages).
PCT/EP2014/068579, International Search Report dated Nov. 14, 2014, with partial English translation (Eight (8) pages).
European Search Report issued in European counterpart application No. 13184593.5-1758 dated Feb. 28, 2014, with Statement of Relevancy (Six (6) pages).
U.S. Patent Application, "Expansion Anchor", filed Mar. 15, 2016, Inventor Marc Schaeffer.
Canadian Office Action issued in Canadian counterpart application No. 2,922,487 dated Apr. 21, 2017 (Three (3) pages).
Russian Office Action issued in Russian counterpart application No. 2016114694112(023104) dated Jun. 5, 2017 (Five (5) pages).

* cited by examiner

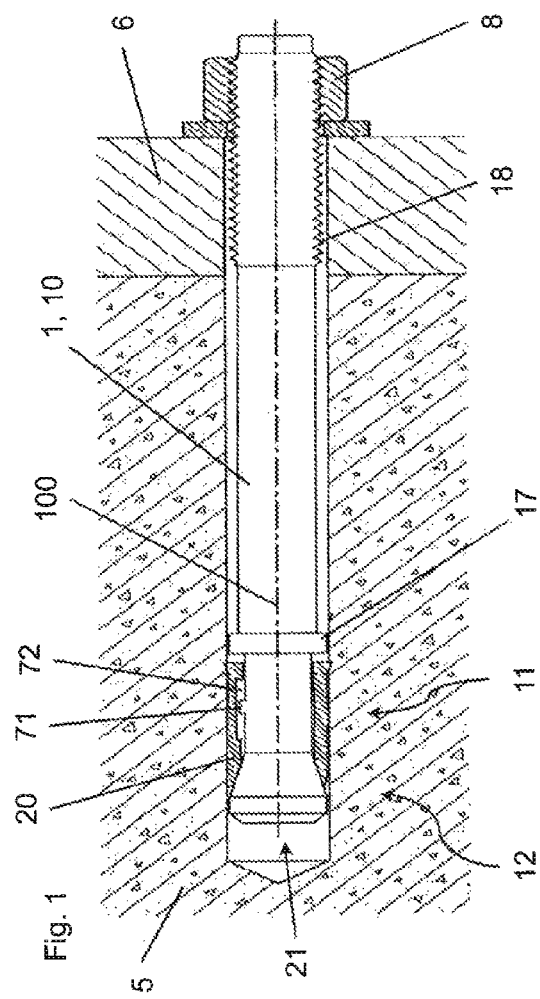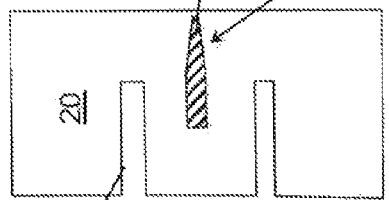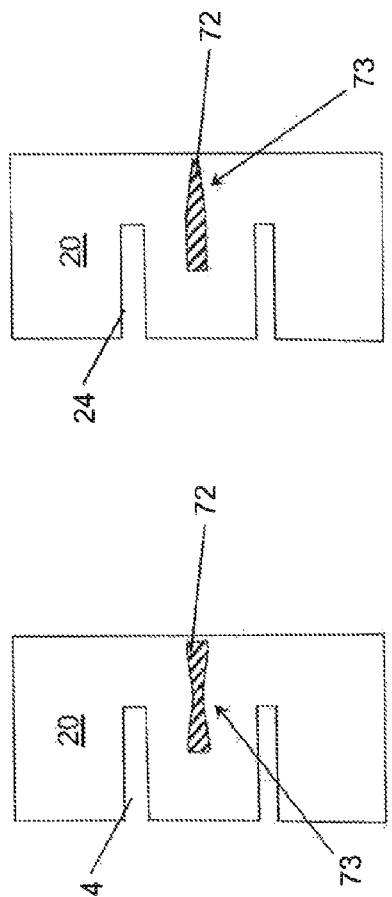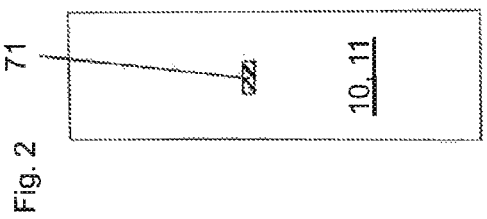

EXPANSION ANCHOR

This application claims the priority of International Application No. PCT/EP2014/068579, filed Sep. 2, 2014, and European Patent Document No. 13184593.5, filed Sep. 16, 2013, the disclosures of which are expressly incorporated by reference herein.

BACKGROUND AND SUMMARY OF THE INVENTION

The invention relates to an expansion anchor. Such an expansion anchor is designed with a bolt as a first element and with an expansion sleeve, which at least partially surrounds the bolt, as a second element, wherein the bolt has an expansion region for spreading apart the expansion sleeve, wherein one of the two elements, particularly on an external peripheral surface or internal peripheral surface, has a groove running in the longitudinal direction of the expansion anchor and the other element has a projection, which engages at least sectionally in the groove.

Expansion anchors are known from DE 101 08 844 A1, for example. They are used in a borehole in a substrate, e.g., in a wall or a ceiling of a construction unit. By pulling the expansion region of the bolt into the expansion sleeve, the latter is radially widened and the expansion anchor is anchored in the substrate.

EP 0 515 916 A2 and DE 22 56 822 A1 describe expansion anchors, in which an anti-rotation means of the expansion sleeve on the bolt is prevented by a groove guide.

The object of the invention is to provide an expansion anchor, which achieves particularly good load values, while having low production costs and high reliability.

The expansion anchor according to the invention is characterized in that the groove has a narrowing that inhibits an axial movement of the expansion sleeve relative to the bolt.

According to the invention, the groove has a narrowing that inhibits an axial movement of the projection relative to the groove, and thus an axial movement of the expansion sleeve relative to the bolt, preferably an axial movement of the expansion sleeve relative to the bolt into the expansion region.

According to the invention, it is thus provided that the cross-section of the groove along the bolt varies, so that the projection engaging into the groove rubs against the groove at varying levels of intensity, depending on the position of the expansion sleeve relative to the bolt, which in turn results in varying forces being required, depending on the position of the expansion sleeve relative to the bolt, to displace the expansion sleeve on the bolt. According to the invention, and in a particularly simple and cost-effective manner, an additional parameter is provided with which one can control the anchoring process of the anchor. This in turn allows one to resolve conflicts that may exist under certain circumstances in conventional expansion anchors. For example, in regard to conventional anchors, it may be desirable to have a relatively stiff design of the sleeve on the one hand, e.g., to counteract the possibility of a premature complete pull-through of the bolt through the sleeve when the anchor is set; however, simultaneously, a relatively malleable design of the sleeve may be desired so that it can adapt particularly well to the substrate for example, and thereby offer particularly good load transfer values. According to the invention, the pull-through behavior can now also be controlled by means of the narrowing of the groove, so that the sleeve can be selected to be malleable in regard to load transfer values, without having to hereby consider the pull-through behavior to a significant degree. In this way, a particularly reliable anchor can be obtained according to the invention.

The narrowing exists for practical purposes at least in the peripheral direction of the bolt and/or the expansion sleeve, i.e., seen in the peripheral direction, the groove at the narrowing is preferably narrower than the width of the projection. Preferably, the groove outside the narrowing is cross-sectionally greater than the projection in such a manner that the projection there can move in an essentially non-frictional manner in the groove. In particular, the groove outside of the narrowing, as seen in the peripheral direction of the bolt and/or the expansion sleeve, may be wider than the projection. This can also have production-related advantages. In particular, in this case the sleeve may be rolled in an especially load-free manner, and thus in an especially simple manner, on the bolt.

The bolt may have a neck region for receiving the expansion sleeve prior to expansion, in which the bolt has preferably, at least sectionally, an at least almost constant cross-section in the longitudinal direction. In the expansion region, the bolt widens towards its tip, i.e., as the distance increases from the neck region. The groove and/or the projection run preferably parallel to the longitudinal axis of the bolt and/or expansion anchor. To the extent that the radial direction and the longitudinal direction are mentioned here, this shall refer in particular to the longitudinal axis of the bolt and/or the anchor, which may be in particular the symmetrical and/or central axis of the bolt and the anchor, respectively.

The expansion sleeve and/or the bolt consist preferably of a metal material. Preferably, the bolt has on its end region opposite the expansion region exterior threads for a nut. In particular, on the bolt, there may be designed a stop, for example, an annular shoulder, which limits a displacement of the sleeve away from the expansion region. However, the expansion sleeve, which may also be designed in a multi-part manner, may also extend to the exterior threads of the bolt. The expansion region is provided according to the invention for spreading out the expansion sleeve, i.e., for the radial widening of the expansion sleeve.

The projection engaging into the groove may also form an anti-rotation means, which inhibits a rotation of the expansion sleeve relative to the bolt about the longitudinal axis of the bolt. Fundamentally, the projection could have discontinuities. However, the projection is preferably continuous.

It is especially preferred that the groove arranged on the bolt, or the projection arranged on the bolt, runs at least partially outside of the expansion region. This design may take into account among other things that the tensile forces of the set expansion anchor are introduced primarily in the expansion region in the bolt. By the groove or the projection running at least partially, preferably entirely, outside the expansion region, one avoids impairing the force transmission. Preferably, the groove, or the projection, on the bolt runs at least sectionally in the neck region, i.e., especially in the region between the expansion region and the stop for the expansion sleeve.

Furthermore, it is preferred that the projection is arranged on the bolt and the groove is arranged on the expansion sleeve. This may be especially advantageous in a production-related manner. For example, the groove may be rolled in. The projection may be formed during a rolling or compressing process.

Alternatively, it may be provided that the projection is arranged on the expansion sleeve and the groove is arranged on the bolt. In this context, it may be especially advantageous that the wall thickness of the expansion sleeve is increased locally by the projection. On the projection, a particularly large expansion can hereby be achieved, without the neck region of the bolt, in which the projection is arranged prior to expansion, being significantly weakened. A local wall thickness increase may refer especially to the wall thickness being larger at the projection than in its periphery.

It may also be provided that the expansion anchor has a plurality of grooves running in the longitudinal, direction of the expansion anchor and a plurality of respective corresponding projections, wherein at least part of the grooves each have a narrowing, which inhibits an axial movement of the corresponding projection and thus an axial movement of the expansion sleeve relative to the bolt, particularly an axial movement of the expansion sleeve relative to the bolt into the expansion region. In addition, all grooves may have such a narrowing. For example, all grooves may be provided on one of the elements and all projections may be provided on the other element. However, a mixed arrangement may also be provided, in which one of the elements has part of the grooves and one has part of the projections.

Depending on the desired force progression, it may be advantageous that the narrowing is provided at one end of the groove or in a middle region of the groove.

Preferably, the projection is a cross-piece, which extends in the longitudinal direction of the expansion anchor, and runs in particular parallel to the longitudinal direction of the expansion anchor. The displacement behavior of the expansion sleeve can thereby be controlled in a more exact manner.

The invention is subsequently explained in further detail by means of preferred embodiments, which are schematically illustrated in the enclosed drawings, wherein individual features of the subsequently depicted embodiments may be executed within the scope of the invention basically in an individual manner or in any combination.

BRIEF DESCRIPTION OF THE DRAWINGS

FIG. 1: A partial longitudinally cut perspective of an expansion anchor according to the invention placed in a concrete substrate;

FIG. 2: A plan view of the exterior side of the bolt of the anchor from FIG. 1 in the neck region;

FIG. 3: A plan view of the interior side of the expansion sleeve of the anchor from FIG. 1; and FIG. 4: A plan view of the interior side of another embodiment of an expansion sleeve for the anchor from FIG. 1.

DETAILED DESCRIPTION OF THE DRAWINGS

FIGS. 1 to 3 depict an embodiment of an expansion anchor 1 according to the invention. As FIG. 1 in particular shows, expansion anchor 1 has a bolt 10 and an expansion sleeve 20, which surrounds bolt 10. Bolt 10 has a neck region 11 with a constant cross-section, and connecting to neck region 11 in the front end region of bolt 10, there is an expansion region 12 for expansion sleeve 20, in which bolt 10 widens starting at the neck region 11 toward its front end. On the side, facing away from expansion region 12, of neck region 11, bolt 10 has a stop designed as an annular shoulder, for example, for expansion sleeve 20. On its rear end region opposite expansion region 12, bolt 10 is furnished with external threads 18 for bolt 10.

As one can see especially in FIG. 3, expansion sleeve 20 has expansion slits 24, which extend from the front face 21 of expansion sleeve 20. These expansion slits 24 facilitate the radial widening of expansion sleeve 20 through expansion region 12 of bolt 10. Expansion sleeve 20 can be produced by rolling on a sheet metal blank.

When setting expansion anchor 1, bolt 10 with expansion region 12 is pushed forward in the direction of longitudinal axis 100 of bolt 10 into a borehole in substrate 5 from FIG. 1. Due to stop 17, expansion sleeve 20 is also thereby inserted into the borehole. Then, bolt 10, is pulled back out a little bit from the borehole, for example by tightening bolt 10. Due to its friction with the borehole wall, expansion sleeve 20 remains and a displacement of bolt 10 occurs relative to expansion sleeve 20, in which expansion region 12 of bolt 10 penetrates always deeper into expansion sleeve 20 in such a manner that expansion sleeve 20 is radially widened by expansion region 12 of bolt 10 and is pressed against the wall of the borehole. By means of this mechanism, expansion anchor 1 is fixed in substrate 5. The set state of expansion anchor 1, in which it is fixed in substrate 5, is depicted in FIG. 1. By means of nut 8, an add-on part 6 can be fixed to substrate 5.

As FIGS. 1 and 2 show, bolt 10 has in its neck region 11 a projection 71, which projects radially outward from bolt 10. As FIGS. 1 and 3 show, expansion sleeve 20 has a groove 72 corresponding to this projection 71, which extends in the direction of the longitudinal axis 100 of bolt 10, preferably parallel to longitudinal axis 100, and in which projection 71 is received. Groove 72 of FIG. 3 has two regions, in which groove 72 is cross-sectionally larger than projection 71, in which projection 71 can move in an essentially friction-free manner. Between these two regions, groove 72 has a narrowing 73. Projection 71 can only pass through this narrowing 73 by increasing the application of force. Narrowing 73 thus inhibits projection 71 from passing through, i.e., it inhibits the axial movement of expansion sleeve 20 relative to bolt 10 at a predetermined axial position. In particular, narrowing 73 can thereby counteract bolt 10 from pulling through expansion sleeve 20 in an undesired manner.

As FIG. 2 shows, projection 71 may be designed as an elongated cross-piece extending toward longitudinal axis 100 of bolt 10, preferably parallel to longitudinal axis 100.

Another embodiment of an expansion sleeve is depicted in FIG. 4. According to the embodiment of FIG. 4, narrowing 73 is located at the end of groove 72, while according to FIG. 3, it was provided in a middle region of groove 72. In particular, narrowing 73 of FIG. 4 is arranged on that end of groove 72, which faces away from expansion region 12 of bolt 10 and faces threads 18.

The invention claimed is:
1. An expansion anchor, comprising:
a bolt; and
an expansion sleeve, wherein the expansion sleeve at least partially surrounds the bolt and has a plurality of expansion slits which extend from a front face of the expansion sleeve:
wherein the bolt has an expansion region for expanding the expansion sleeve;
wherein one of the bolt and the expansion sleeve has a groove running in a longitudinal direction of the expansion anchor and wherein the other one of the bolt and the expansion sleeve has a projection which engages at least sectionally into the groove;
and wherein the groove has a local narrowing which inhibits an axial movement of the expansion sleeve relative to the bolt.

2. The expansion anchor according to claim 1, wherein the groove is wider outside of the narrowing, when viewed in a peripheral direction of the bolt and/or the expansion sleeve, than the projection.

3. The expansion anchor according to claim 1, wherein the groove is disposed on the bolt and wherein the groove is disposed at least partially outside of the expansion region.

4. The expansion anchor according to claim 1, wherein the projection is disposed on the bolt and wherein the projection is disposed at least partially outside of the expansion region.

5. The expansion anchor according to claim 1, wherein the projection is disposed on the bolt and the groove is disposed on the expansion sleeve.

6. The expansion anchor according to claim 1, wherein the projection is disposed on the expansion sleeve and the groove is disposed on the bolt and wherein a wall thickness of the expansion sleeve is locally increased by the projection.

7. The expansion anchor according to claim 1, wherein the expansion anchor includes a plurality of grooves running in the longitudinal direction of the expansion anchor and a plurality of respectively corresponding projections, wherein at least a portion of the plurality of grooves each have a narrowing which inhibits an axial movement of the expansion sleeve relative to the bolt.

8. The expansion anchor according to claim 1, wherein the narrowing is disposed on an end of the groove or is disposed in a middle region of the groove.

9. The expansion anchor according to claim 1, wherein the projection is a cross-piece which extends in the longitudinal direction of the expansion anchor.

* * * * *